United States Patent [19]

Kobari

[11] Patent Number: 4,637,036
[45] Date of Patent: Jan. 13, 1987

[54] CIRCUIT ARRANGEMENT FOR A DATA ACQUISITION CIRCUIT OF A PCM PROCESSOR AND A METHOD FOR IMPROVING WAVEFORM OF PCM SIGNAL EYE PATTERN

[75] Inventor: Harukuni Kobari, Yokohama, Japan

[73] Assignee: Victor Company of Japan, Limited, Japan

[21] Appl. No.: 612,014

[22] Filed: May 18, 1984

[30] Foreign Application Priority Data

May 20, 1983 [JP] Japan ................................. 58-88719

[51] Int. Cl.⁴ ............................................. H04B 1/12
[52] U.S. Cl. ........................................ 375/76; 375/34;
375/101; 328/164; 358/155; 360/45
[58] Field of Search ..................... 375/13, 34, 76, 101;
360/45, 46, 48, 67; 328/164; 358/19, 155, 335

[56] References Cited

U.S. PATENT DOCUMENTS

| 3,660,821 | 5/1972 | Weber et al. | 360/48 |
| 3,832,577 | 8/1974 | Harr | 375/76 |
| 3,840,892 | 10/1974 | Hayashi | 360/45 |
| 4,241,455 | 12/1980 | Eibner | 455/608 |
| 4,245,345 | 1/1981 | Gitlin et al. | 375/13 |
| 4,358,790 | 11/1982 | Summers | 375/76 |

FOREIGN PATENT DOCUMENTS 0026597  4/1981  European Pat. Off. .
0097723  1/1984  European Pat. Off. .
82/00228  1/1982  PCT Int'l Appl. .
2113051  7/1983  United Kingdom .

OTHER PUBLICATIONS

Carlson, *Communications Systems*, McGraw-Hill, 1975, Second Edition, p. 23.
IBM TDB, vol. 22, No. 8A, Jan. 1980, pp. 3328–3330.

*Primary Examiner*—Robert L. Griffin
*Assistant Examiner*—Raymond C. Glenny
*Attorney, Agent, or Firm*—Lowe, Price, Leblanc, Becker & Shur

[57] ABSTRACT

A circuit arrangement comprises a frequency response control circuit for controlling the level around a particular frequency of an input PCM signal in accordance with a control signal which is produced as a function of the difference between levels of positive peaks and/or negative peak corresponding to a logic bit pattern 1010 of a data synchronous signal of the PCM signal having a predetermined format. The level detection may be performed by a plurality of sample-and-hold circuits, and the difference is obtained by way of an adder-subtractor. The circuit may be arranged to constitute either a feedback loop in which level detection is effected by using a frequency response controlled PCM signal, or a feedforward system in which level detection is effected by using the input PCM signal whose frequency response has not been controlled. An output signal from the frequency response control circuit is then applied to two comparators of a conventional data acquisition circuit.

9 Claims, 16 Drawing Figures

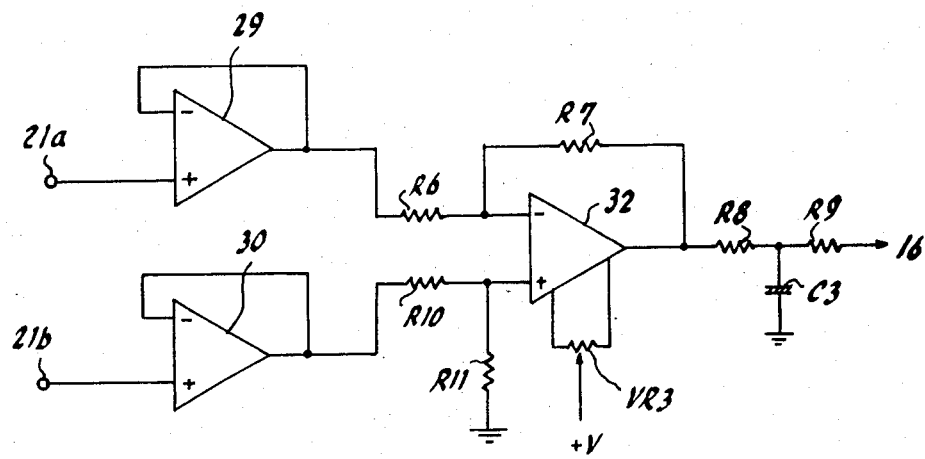
FIG.12
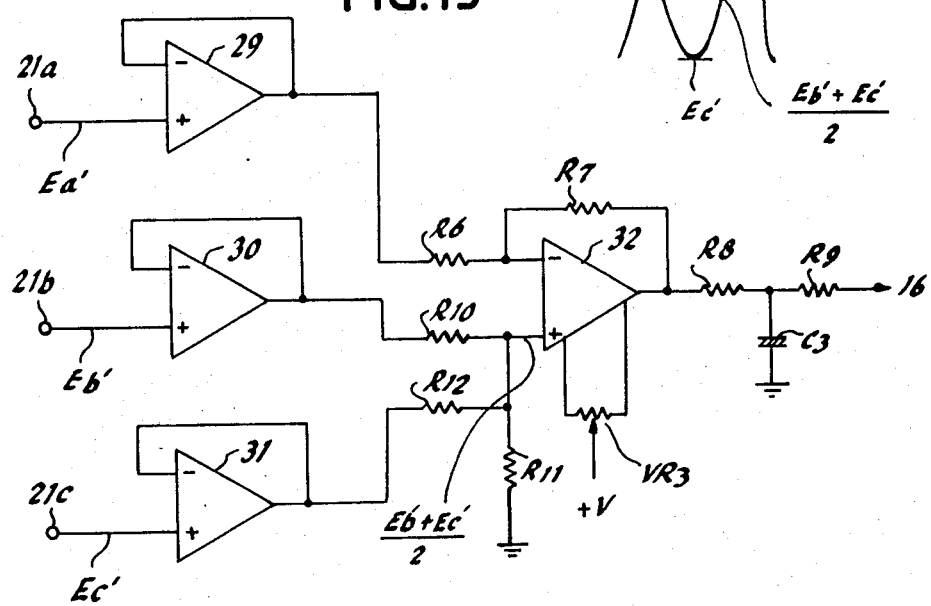
FIG.13
FIG.14

CIRCUIT ARRANGEMENT FOR A DATA ACQUISITION CIRCUIT OF A PCM PROCESSOR AND A METHOD FOR IMPROVING WAVEFORM OF PCM SIGNAL EYE PATTERN

BACKGROUND OF THE INVENTION

This invention relates generally to PCM signal processing circuits, and particularly to a data acquisition circuit of a PCM processor used for recording and reproducing audio signals by using video tape recorders.

It has been several years since PCM (pulse code modulation) processors were put on market, which are to be connected to a home-use video tape recorder (which will be referred to as VTR hereinafter) using a ½ inch magnetic recording tape for recording and reproducing audio signals in order to effect new high-fidelity recording and reproducing of audio signals. Although home-use VTRs were of standard-time mode at the time of designing such PCM processors, today's home-use VTRs are mainly of long-time mode, in which the tape motion speed is made lower than that in standard-time mode, because of recent technical innovation such as high-density recording, progress in reproducing techniques, and improvement in magnetic recording tapes. Under the above-mentioned condition, PCM processors, which are designed to be used in standard-time mode where recording and reproducing characteristics are satisfactory, are sometimes used in long-time mode of home-use VTRs. However, since recording and reproducing characteristics in long-time mode is not satisfactory compared to standard-time mode, some troubles would occur due to the occurrence of noise and operation of a muting circuit.

PCM processors, which record and reproduce audio signals by using a home-use VTR are described in detail in a technical file (STC-007,008) or in a standard CPZ-105 of EIAJ (Electronic Industry Association of Japan), and PCM processors now on the market are all designed according to the recording format (which may be referred to as EIAJ format) desribed in the EIAJ technical file or standard. In addition, various materials are disclosed as to brief description of PCM processors according to EIAJ format. Therefore, the present description is provided mainly in connection with a data acquisition circuit which extracts digital data from a reproduced signal from a VTR.

Although a conventional data acquistion circuit used in a PCM processor satisfactorily operates when a PCM signal is reproduced from a VTR which is operated in standard-time mode, the conventional data acquisition circuit cannot be satisfactorily used when a PCM signal is reproduced from a VTR operated in long-time mode because of deterioration or distortion in the waveform of the reproduced PCM signal.

SUMMARY OF THE INVENTION

The present invention has been developed in order to remove the above-described drawbacks inherent to the conventional data acquistion circuit used in a PCM processor.

It is, therefore, an object of the present invention to provide a new and useful data acquisition circuit of a PCM processor and a method for improving PCM signal waveform, with which accurate detection of digital data is performed even if a PCM signal is recorded and reproduced from a VTR operated in long-time mode.

According to a feature of the present invention peak levels of logic "1s" and/or logic "0" of an input PCM signal are detected so that the difference in level between logic "1" signal and a subsequent logic "1" signal and/or the difference in level between a logic "0" signal and a subsequent logic "1" signal is/are obtained for producing a control signal which will be used for controlling frequency response of the PCM signal.

Another feature of the present invention is that deterioration in the eye pattern of a reproduced PCM signal due to variations in digital transmission line characteristics can be automatically corrected so as to make it possible to effect accurate data acquisition. Since PCM signals derived from a VTR operated in long-time mode can be accurately processed with high stability and reliability by the data acquistion circuit according to the present invention, recording tape cost per unit information can be reduced.

The circuit arrangement according to the present invention comprises a frequency response control circuit for controlling the gain around a particular frequency of an input PCM signal in accordance with a control signal which is produced as a function of the difference between levels of positive peaks and/or negative peaks corresponding to a 1010 bit pattern of logic a data synchronizing signal of the PCM signal having a predetermined format. The level detection may be performed by a plurality of sample-and-hold circuits, and the difference is obtained by way of an adder-subtractor. The circuit may be arranged to constitute either a feedback loop in which level detection is effected by using a frequency response controlled PCM signal, or a feedforward system in which level detection is effected by using the input PCM signal whose frequency response has not been controlled. An output signal from the frequency response control cicuit is then applied to two comparators of a conventional data acquisition circuit.

In accordance with the present invention there is provided a circuit arrangement for a data acquisition circuit for a PCM processor responsive to a PCM signal of a predetermined format and having a synchronizing signal of a bit pattern of 1010, and a digital signal, comprising: first means for detecting positive and/or negative peak level of said 1010 bit pattern of said synchronizing signal; second means for detecting the difference between said peak levels for producing a control signal; and a frequency response control means responsive to said control signal for changing the frequency response of said PCM signal.

In accordance with the present invention there is provided a method of improving the waveform of eye pattern of a PCM signal of a predetermined format and having a 1010 synchronizing signal, and a digital signal, comprising the steps of: detecting positive and/or negative peak level of said 1010 bit pattern of said data synchronizing signal; detecting the difference between said peak levels for producing a control signal; and controlling the frequency response of said PCM signal in accordance with the difference.

BRIEF DESCRIPTION OF THE DRAWINGS

The object and features of the present invention will become more readily apparent from the following detailed description of the preferred embodiments taken in conjunction with the accompanying drawings in which:

FIG. 12 is a circuit diagram of the adder-subtractor used in the circuit of FIG. 9, where the adder-subtractor is responsive to two input signals;

FIG. 13 is a circuit diagram of the adder-subtractor used in the circuit of FIG. 9, where the adder-subtractor is responsive to three input signals;

FIG. 14 is an explanatory waveform for the description of the adder-subtractor of FIG. 13.

The same or corresponding elements and parts are designated at like reference numerals throughout the drawings.

DETAILED DESCRIPTION OF THE INVENTION

Prior to describing embodiments of the present invention, the conventional data acquisition circuit of a PCM processor will be described for a better understanding of the present invention with reference to FIGS. 1 through 5.

Figure 1:
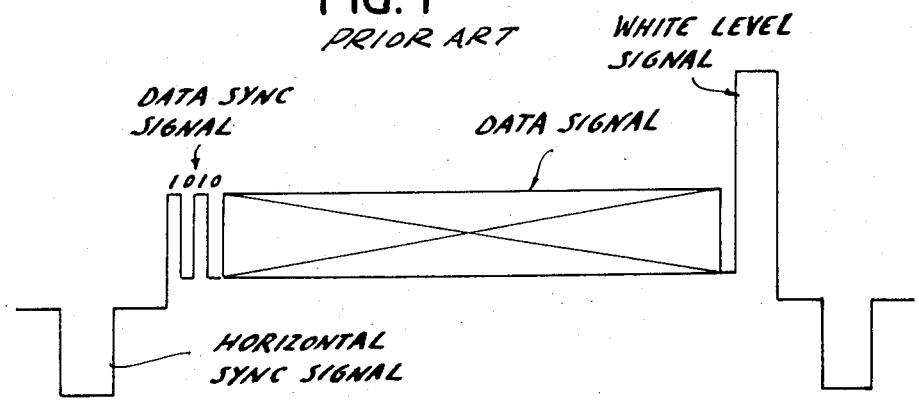
FIG. 1 is a diagram showing the waveform of a PCM signal according to a recording format described in the EIAJ technical file or standard.
Figure 2:
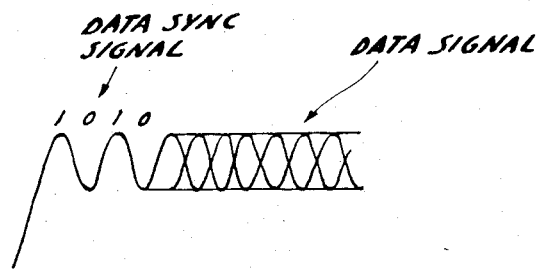
FIG. 2 is a diagram showing an example of a waveform of a PCM signal reproduced from a VTR.

As shown in FIG. 1, a PCM signal comprises a horizontal synchronizing signal, a data synchronizing signal having a bit pattern of 1010, a data signal, and a white-level signal. When first recording the PCM signal of FIG. 1 on a magnetic recording tape by way of a VTR and then reproducing the same, the waveform of the reproduced signal does not exactly assume the waveform of FIG. 1, but assumes various waveforms depending on the characteristics of the VTR and a tape used therein. One example of such a reproduced signal waveform is shown in FIG. 2 illustrating only the data synchronizing signal and data signal with the portion around the data synchronizing signal being enlarged. The waveform shown in FIG. 2 is called an eye pattern. The waveform shown in FIG. 2 shows an eye pattern of relatively satisfactory transmission characteristic, and such a waveform can be obtained when recording and reproducing in standard-time mode of a VTR.

Figure 3:
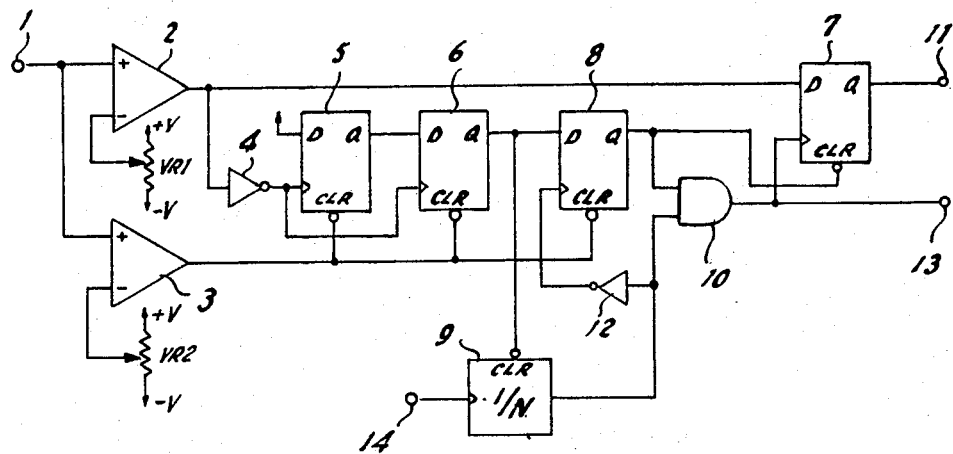
FIG. 3 is a diagram showing an example of a conventional data acquisition circuit which extracts data from a reproduced signal, which is shown in FIG. 2, from a VTR.

A conventional data acquisition circuit will be described with reference to FIG. 3. In FIG. 3, the reference 1 is an input terminal; 2 and 3, operational amplifiers; 4, an inverter; 5, 6, 7 and 8, latches; 9, a frequency divider; 10, AND gate; 11, an output terminal; 12, an inverter; 13, an output terminal; 14, a clock pulse input terminal; and VR1 and VR2, variable resistors.

The input terminal 1 is connected to non-inverting input terminals of the operational amplifiers 2 and 3, while an inverting input terminal of the operational amplifier 2 is connected to a movable contact of the variable resistor VR1, and an output terminal of the operational amplifier 2 is connected to a clock terminal of latches 5 and 6 via the inverter 4 (the clock terminal is indicated at > in FIG. 3, remaining latches being shown in the same manner). The output terminal of the operational amplifier 2 is also connected to a terminal D of the latch 7. An inverting input terminal of the operational amplifier 3 is connected to a movable contact of the variable resistor VR2, and its output terminal is connected to terminals CLR, which are clear terminals of respective latches 5, 6 and 8. A terminal D of the latch 5 is connected to a d.c. power source terminal, while a terminal Q is connected to a terminal D of the latch 6. A terminal Q of the latch 6 is connected to a terminal D of the latch 8, and is also connected to a terminal CLR of the frequency divider 9. A terminal Q of the latch 8 is connected to a terminal CLR of the latch 7, and is also connected to an input terminal of the AND gate 10. A terminal Q of the latch 7 is connected to the output terminal 11. An output terminal of the frequency divider 9 is connected via the inverter 12 to a clock terminal of the latch 8, and is also connected to an input terminal of the AND gate 10. An output terminal of the AND gate 10 is connected to a clock terminal of the latch 7, and to the output terminal 13. The clock pulse input terminal 14 is connected to a clock terminal (indicated at > in FIG. 3) of the frequency divider 9.

Figure 4:
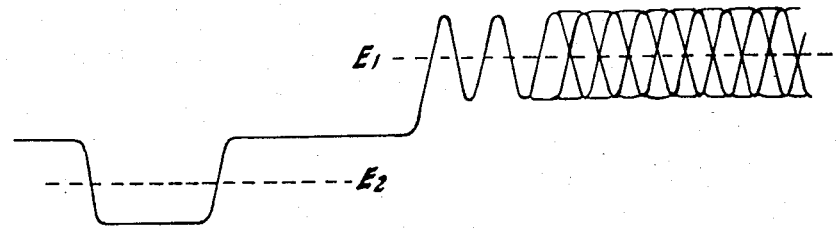
FIG. 4 is a diagram showing an example of a reproduced signal from a VTR, which signal is to be inputted to the data acquisition circuit shown in FIG. 3.

In FIG. 3, when a PCM signal reproduced from a VTR as shown in FIG. 4 (the PCM signal may be referred to as reproduced PCM signal hereinafter) is applied to the input terminal 1, the above-mentioned reproduced signal is inputted to the non-inverting input terminals of the respective operational amplifiers 2 and 3, while respective inverting input terminals are supplied with reference voltages for comparison, which are voltage-divided by the variable resistors VR1 and VR2. These reference voltages for comparison have values E1 and E2 shown in FIG. 4, and especially it is best that E1 is set to a point where the waveform crosses (i.e. the position of the center of the eye pattern). A waveform shown in FIG. 5(A) is outputted from the output terminal of the operational amplifier 2 whose reference value is predetermined, while a waveform shown in FIG. 5(B) is outputted from the output terminal of the operational amplifier 3. FIG. 5(A) corresponds to the data synchronizing signal and the data signal of FIG. 1, while FIG. 5(B) corresponds to the horizontal synchronizing signal.

In the above, since the waveform shown in FIG. 5(A) is obtained by simple conversion into a binary signal by way of the operational amplifier 2, it is difficult to effect digital signal processing after this with such waveform because the duty cycle of 1 and 0 changes depending on the value of the comparison reference voltage E1, or because the time base changes due to jitter or the like of the VTR. Furthermore, since the waveform shown in FIG. 5(A) includes signals other than data signal, for instance, data synchronizing signal and the white-reference signal, it is necessary to extract only the data from the waveform shown in FIG. 5(A).

Now it will be described in connection with a strobe pulse, which is a sampling pulse to be applied to a sampling circuit for stabilizing the time base, and in connection with the way of accurately extracting only data.

Stabilization of time base can be readily actualized by way of a latch with which an input signal is outputted in synchronism with a clock pulse. Therefore, the way of producing the clock pulses for driving the latch is of great importance, and the way of producing the clock pulses will be described. In FIG. 3, the latch 7 corresponds to the above-mentioned latch, and the latch 7 is driven by strobe pulses, which are the output of the AND gate 10. The frequency of the strobe pulses is determined by the transmission bit rate of the PCM signal. The transmission bit rate according to EIAJ format is approximately 2.64 MHz, and the duty cycle of 1 and 0 of the output signal from the operational amplifier 2 changes depending on the comparison reference voltage E1. For instance, if E1 is higher than the level indicated at a dotted line in FIG. 4, the waveform of the operational amplifier 2 is affected such that a positive going pulse of logic "1" is narrow and a negative going pulse of logic "0" is wide. Accordingly, in order to accurately latch the output signal from the operational amplifier 2, not only the frequency but also the phase (i.e. latching timing) are of great importance. To output strobe pulses, which satisfy the above-mentioned necessary conditions, a frequency divider having a terminal CLR (clear) is generally used. Namely, when bit transmission rate frequency is f, by inputting clock pulses having a frequency of Nf (N is a positive integer) to a frequency divider having a terminal CLR (clear) so that the frequency dividing ratio is 1/N, clock pulses having a frequency f, and the phase is adjusted by controlling the timing of cancelling the clearing operation. Although phase adjustment with high precision is possible if N is set to a large vaue, since the frequency of the driving pulses becomes high, the value of N is generally set to an integer around 4 to 8. In FIG. 3 the frequency divider 9 is a frequency divider having a terminal CLR (clear), and is supplied with clock pulses having a frequency Nf from the clock pulse input terminal 14. Output pulses from the frequency divider 9 are inputted via the AND gate 10 to the clock terminal of the latch 7.

Figure 5:
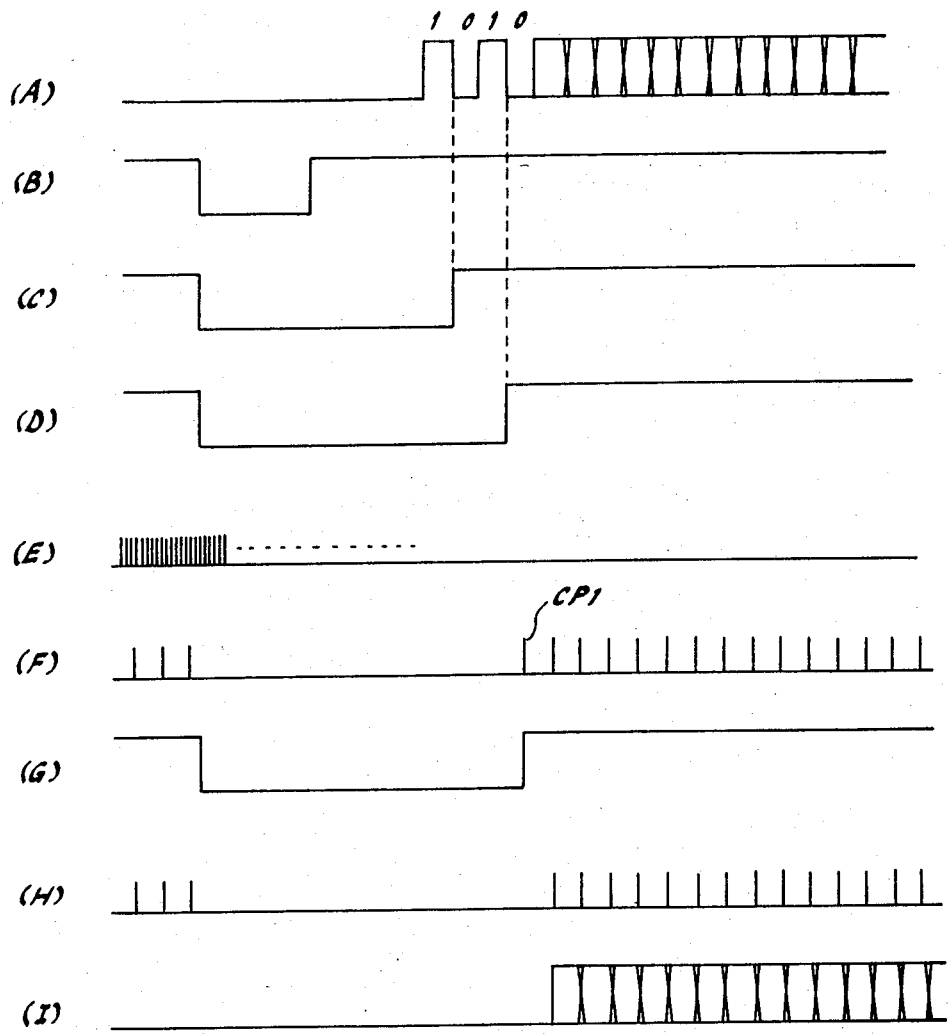
FIG. 5 is an explanatory diagram for the description of the operation of the data acquisition circuit shown in FIG. 3.

Nextly, it will be described in connection with a signal for phase adjustment which is fed to a clear terminal CLR of the frequency divider 9. To the respective terminals CLR of the latches 5, 6 and 8 is applied the output directly from operational amplifier 3. Normally, a synchronous signal protecting circuit is often interposed between the operational amplifier 3 and the terminals CLR of the latches 5, 6 and 8. However, since this protecting circuit is not important in understanding the operational principle of the PCM data acquistion circuit, it is omitted from FIG. 3, and its description is also omitted. FIGS. 5(C) and (D) show output waveform from the terminal Q of the latches 5 and 6, and FIG. 5(E) is a timing chart of clock pulses inputted to the clock input terminal 14. FIG. 5(F) shows a waveform of the output from the frequency divider 9, and FIG. 5 (G) shows a waveform of the outpupt from the terminal Q of the latch 8. The output at the terminal Q of the latches 5, 6 and 8 is inverted in response to a first trailing edge of the output signal from the operational amplifier 2, and therefore, the output at the latch 5 changes from 0 to 1 as shown in FIG. 5(C). Furthermore, in response to a second trailing edge of the output signal from the operational amplifier 2 the output at the terminal Q of the latch 6 is inverted as shown in FIG. 5(D), and therefore, the output at the terminal Q of the latch 6 turns to 1. As a result, the frequency divider 9, which has been in a cleared condition, is put in a clear-cancellation condition so as to start frequency dividing operation thereby producing clock pulses shown in FIG. 5(F). Namely, the adjustment of phase of the strobe pulse is effected by a signal synchronized with the trailing edge of the second 1 of the data synchronizing signal of 1010. In this way, although the output signal from the frequency divider 9 is a clock pulse signal whose frequency and phase are both adjusted, undesirable condition occurs since a first clock pulse CP1 latches a second 0 of the data synchronizing signal. Therefore, in order to remove the first clock pulse CP1 of the output signal from the frequency divider, the AND gate 10 is provided. To one of the two inputs of the AND gate 10 is supplied the output signal from the frequency divider 9, and to the other input thereof is supplied the terminal Q output signal from the latch 8. To the clock terminal of the latch 8 is fed an output signal from the inverter 12, namely, an inverted signal of the output signal from the frequency divider 9. The latch 8 performs inverting operation as shown in FIG. 5(G) in synchronism with the first pulse CP1 of the output signal from the frequency divider. The output of the AND gate 10 turns as shown in FIG. 5(H) by the output signal from the terminal Q of the latch 8 so that it becomes a strobe pulse of the latch 7. In the above-described manner, the signal inputted to the input terminal 1, which signal is in condition of an analog signal as shown in FIG. 4, is converted to a binary signal, which makes it possible to effect various digital processing subsequent to the circuit shown in FIG. 3, by way of the circuit shown in FIG. 3, and a PCM data portion shown in FIG. 5(I) is outputted from the output terminal 3.

Since the data acquisition circuit described in the above is a portion which greately affects the stability and reliability of the PCM processor, actual PCM processors comprise circuit elements other than those shown in FIG. 3. For instance, while the comparison reference voltages inputted to the inverting input terminals of the operational amplifiers 2 and 3 are supplied from the variable resistors VR1 and VR2, a circuit for automatically setting them to an optimum values, and means for inserting an AGC circuit at a front stage of the input terminal 1 for compensating for the variation of the input signal level are provided.

Figure 6:
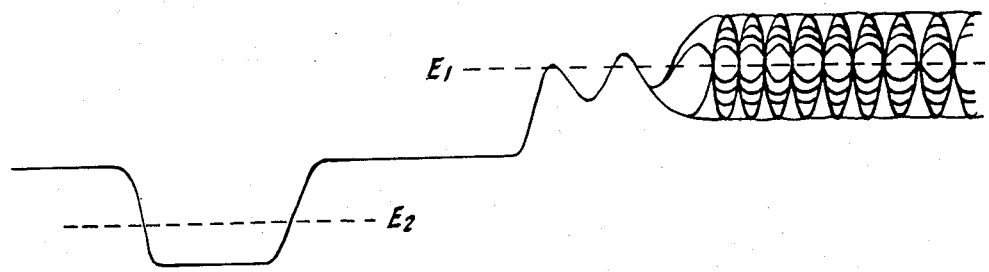
FIG. 6 is a diagram showing an example of a reproduced PCM signal waveform in the case that a VTR is used in long-time mode.

In the above-described operation of the conventional data acquisition circuit, a signal having a satisfactory eye pattern as shown in FIG. 4 has been assumed as the input signal. However, it assumes various signal waveform and eye pattern depending on the sort of VTR used in actual practice. Although a relatively satisfactory reproduced waveform and eye patern can be obtained as shown in FIG. 4 when a VTR is used in standard-time mode, the reproduced signal usually suffers from deterioration in S/N ratio and drop in high-frequency component when a VTR is used in long-time mode. FIG. 6 shows an example of a reproduced PCM signal waveform in the case that a VTR is used in long-time mode. As shown in FIG. 6, the waveform of the above-described reproduced signal is deteriorated. Especially, the waveform of a portion corresponding to the data synchronizing signal of 1010 has a tendency of having a low level with respect to the center level E1 of the eye pattern. For this reason, when the reproduced signal waveform of FIG. 6 is inputted as the input signal, misdetection occurs when detecting the first 1 of the data synchronous signal of 1010, and this results in erroneous output data. Furthermore, since a satisfactory eye pattern cannot be obtained, data error is apt to occur due to slight external disturbance (such as crosstalk and jitter).

Therefore, PCM processors having a data acquisition circuit according to the above-described conventional system has a drawback that it cannot provide satisfactory reproduced sounds because of too much occurrence of data error when used for a PCM signal derived from a VTR operated in long-time mode.

EMBODIMENTS OF THE INVENTION

Figure 7:
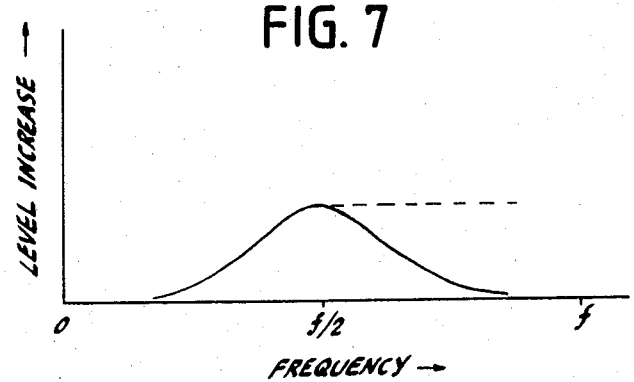
FIG. 7 is a diagram for the description of a way of correction of a high-frequency component.
Figure 8A:
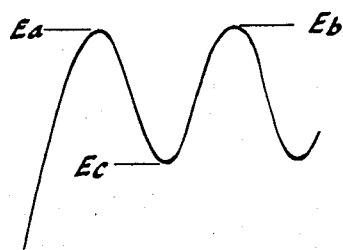
FIGS. 8(A) and (B) are diagrams showing enlarged waveform of the data sychronous signal portion of the reproduced PCM signal.
Figure 8B:
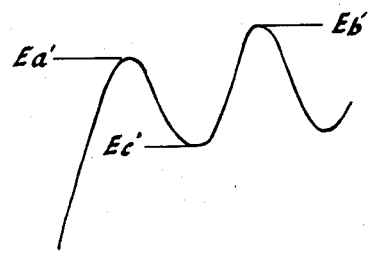
Figure 9:
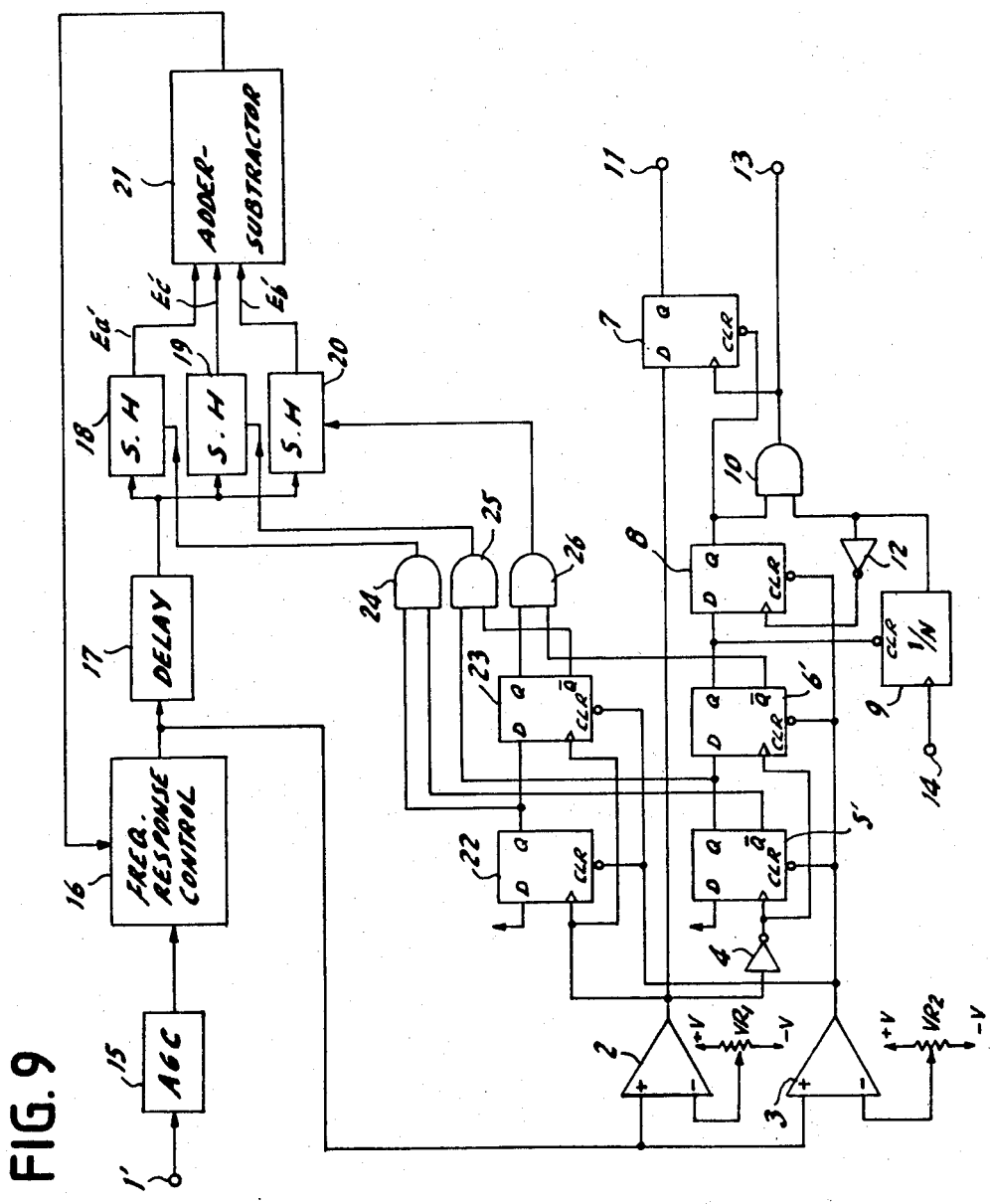
FIG. 9 is a block diagram showing an embodiment of a data acquisition circuit according to the present invention.
Figure 10:
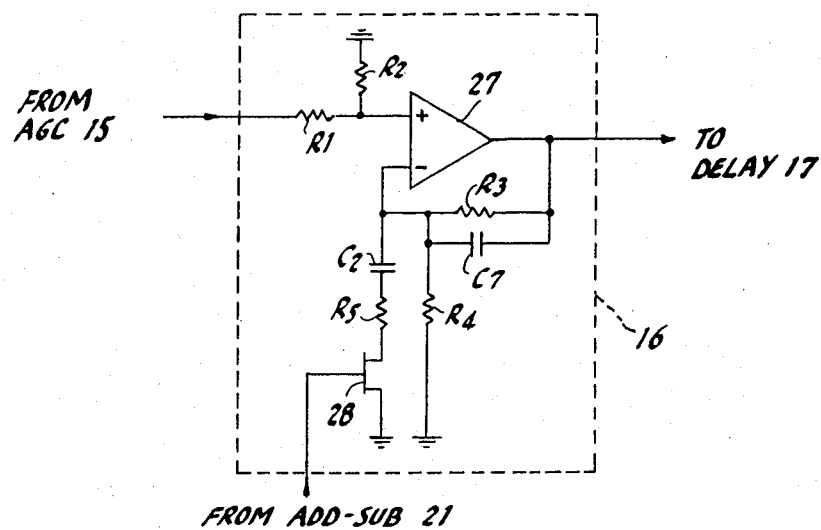
FIG. 10 is a circuit diagram showing an example of a frequency response control circuit of the data acquisition circuit shown in FIG. 9.

An embodiment of a data acquisition circuit according to the present invention will be described with reference to FIGS. 6 through 15. FIG. 6 is a diagram showing an example of a reproduced PCM signal waveform in the case that a VTR is used in long-time mode. FIG. 7 is a diagaram for the description of a way of correction of a high-frequency component. FIGS. 8(A) and (B) are diagrams showing enlarged waveform of the data sychronizing signal portion of the reproduced PCM signal. FIG. 9 is a block diagram showing an embodiment of a data acquisition circuit according to the present invention. FIG. 10 is a circuit diagram showing an example of a frequency response control circuit of the data acquistion circuit shown in FIG. 9. FIGS. 11(A) through (J) are diagrams for the description of the data acquisition circuit shown in FIG. 9.

First of all, improvement of the eye pattern of the reproduced signal will be described. In digital signal transmission, possible causes for the deterioration of the eye pattern of the signal are frequency response of the transmission line, defective group delay frequency characteristic, distortion factor, S/N ratio, or the like, and in the case of FIG. 6 which is a diagram showing an example of a reproduced PCM signal waveform obtained by recording and reproducing in the above-mentioned long-time mode of a VTR, the eye pattern deteriorates when the data assumes 101010 ... and when data of 1 or 0 singularly appears so that the level decreases. Namely, a main cause for the deterioration of the eye pattern is the attenuation in high-frequency components. Accordingly, if the term high-frequency components of the reproduced PCM signal are corrected, the eye pattern can be improved. The term "high-frequency components" is used to mean frequency components around f/2 wherein f is the bit transmission frequency, and therefore, if the frequency response around the frequency f/2 is changed, i.e. increased, as shown in FIG. 7, the eye pattern can be improved.

Considering the amount of increase in frequency response, it is obvious that the amount of increase in frequency response has to be changed depending on variations throughout various VTR characteristics. More specifically, if the signal of FIG. 4 having a satisfactory eye pattern is inputted to a circuit which is put in a condition so that an optimum eye pattern would be obtained in response to the signal shown in FIG. 6 by correcting the high-frequency components, the high-frequency components of the satisfactory eye pattern is excessively changed resulting in deterioration of the satisfactory eye pattern. Therefore, it will be understood from the above that it is necessary to select different values of correction amount of frequency response for long-time mode and standard-time mode even if the same VTR is used, while it is a matter of course to do so when the VTR to be connected to the PCM processor is changed. Furthermore, it will be understood that the gain or level adjustment of the high-frequency components has to be automatically done in accordance with the condition of the reproduced PCM signal. In order to effect such automatic level adjustment of the high-frequency components, it is possible to obtain a control signal from the condition of a signal waveform of the data synchronizing signal of 1010 included in the reproduced PCM signal. FIGS. 8(A) and (B) are diagrams showing an enlarged view around data synchronizing signal, where FIG. 8(A) is of the case that the transmission characteristic is satisfactory, and FIG. 8(B) is of the case that the high-frequency components have been attenuated. In the case that the transmission characteristic is satisfactory as shown in FIG. 8(A), the peak level Ea of a first positive peak corresponding to a first logic "1" of the data synchronous signal having a bit pattern of 1010 substantially equals the peak level Eb of a second positive peak corresponding to logic "1". Furthermore, the difference expressed in terms of Eb–Ec between the peak level Ec of a first 0 of the data synchronous signal and the peak level Eb of the second 1 assumes a predetermined value, such as 0.3 V. This predetermined value is the signal level of the data synchronous signal and data portion of the signal waveform on PCM recording as shown in FIG. 1, and is determined at 0.3 V in EIAJ format.

On the other hand, in the case that the level of the high-frequency components is relatively low as shown in FIG. 8(B), the peak level Ea' of a first 1 of the data synchronizing signal of 1010 has a tendency to be lower than the peak level Eb' of a second 1, and furthermore, the value of Eb'–Ec' is smaller than the predetermined value wherein Ec' is the peak level of a first negative going pulse corresponding to a first logic "0". By using these phenomena, the control signal for frequency response control of the high-frequency components is obtained. Here, there are three possibilities in production of the control signal as follows:

(1) Eb'–Ea';
(2) Eb'–Ec';
(3) Use all Ea', Eb' and Ec' so that the difference between Ea' and an intermediate voltage between Eb' and Ec' is derived, such as Ea'–(Eb'+Ec)/2.

Now the way of frequency response control of the high-frequency components by using the above-described control signal will be described with reference to FIG. 9. In FIG. 9, structual parts which are identical with those in FIG. 3 are denoted by the same reference numerals, and description thereof is omitted. The reference 1' is an input terminal; 5' and 6', latches; 15, an AGC circuit; 16, a frequency response control circuit; 17, a delay circuit; 18, 19 and 20, sample-and-hold circuits; 21, an adder-subtractor; 22 and 23, latches; and 24, 25 and 26, AND gates.

The input terminal 1' is connected via the AGC circuit 15 and the frequency response control circuit 16 to non-inverting input terminals of operational amplifiers 2 and 3, and via the delay circuit 17 to the sample-and-hold circuits 18, 19 and 20. Output terminals of the sample-and-hold circuits 18, 19 and 20 are connected to input terminals of the adder-subtractor 21, whose output terminal is connected to the frequency response control circuit 16 so that the frequency response control circuit 16, the delay circuit 17, the sample-and-hold circuits 18, 19 and 20, and the adder-subtractor 21 constitute a feedback loop. An output terminal of the operational amplifier 2 is connected, in the same manner as in the data acquisition circuit of FIG. 3, via the inverter 4 to clock terminals (which are indicated at > in FIG. 9, and other latches are shown in the same manner) of latches 5' and 6' having terminals $\overline{Q}$ which are terminals for outputting inverted output of terminals Q of latches 5 and 6. Furthermore, the output terminal of the operational amplifier 2 is also connected to clock terminals of latches 22 and 23. An output terminal of the operational amplifier 3 is connected to terminals CLR of the latches 5', 6', 22 and 23. A terminal D of the latch 22 is connected to a power source terminal, while a terminal Q thereof is connected to a terminal D of the latch 23 and to an input terminal of the AND gate 24. The terminal $\overline{Q}$ of the latch 5' is connected to an input terminal of the AND gate 24 whose output terminal is connected to the sample-and-hold circuit 18. The latch 5' is connected, in the same manner as in the data acquisition circuit of FIG. 3, to a terminal D of the latch 6', and to an input terminal of the AND gate 25. The terminal $\overline{Q}$ of the latch 23 is connected to an input terminal of the AND gate 25 whose output terminal is connected to the sample-and-hold circuit 19. A terminal Q of the latch 23 is connected to an input terminal of the AND 26, while the output terminal $\overline{Q}$ of the latch 6' is connected to an input terminal of the AND gate 26 whose output terminal is connected to the sample-and-hold circuit 20.

A reproduced PCM signal from a VTR is inputted to the input terminal 1', and since the level variation of the reproduced PCM signal from the VTR to be fed to the AGC circuit 15 is slight, no problem would occur if the AGC circuit 15 were omitted. The above-mentioned reproduced signal is inputted to the frequency response control circuit 16. The frequency response control circuit 16 is arranged to change the gain of the high-frequency. components of the input signal by using as a control signal the output signal from the adder-subtractor 21, which will be described in detail hereinlater. One example of the frequency response control circuit 16 is shown in FIG. 10.

In FIG. 10, the reference 27 is an operational amplifier; 28, an FET, R1 to R5, resistors; and C1 to C2 are capacitors. An input terminal, to which the reproduced PCM signal from the VTR is inputted, is connected via the resistor R1 to a non-inverting input terminal of the oprational amplifier 27, and to the non-inverting input terminal of the operational amplifier 27 is connected one terminal of the resistor R2 the other terminal of which is grounded. An output terminal of the operational amplifier 27 is connected to the delay circuit 17, and is connected via a parallel circuit of the resistor R3 and the capacitor C1 to one terminal of the resistor R4 the other terminal of which is grounded, and to an inverting input terminal of the operational amplifier 27. The output terminal of the adder-subtractor 21 is connected to gate of the FET 28, whose drain is connected via a series circuit of the resistor R5 and the capacitor C2 to the inverting input terminal of the operational amplifier 27, while the source of the FET 28 is grounded. The resistors R1 and R2 shown in FIG. 10 are inserted for adjusting the overall gain of the frequency response control circuit 16. To control the level of the high-frequency components by the frequency response control circuit 16, variable resistance characteristic of the FET 28 is used. More specifically, when the resistors R3 and R4 are made equal to each other, and when the resistors R1 and R2 are also made equal to each other, gain at a low-frequency range, which is considerably lower than f/2, becomes 1, while the high-frequency components are corrected by the capacitor C2 where the amount of correction is determined by the resistor R5 and the resistance between drain and source of the FET 28. However, with only such an arrangement the level of the high-frequency components is increased such that unnecessary high-frequency components are also level-increased as shown by a dotted line in FIG. 7, resulting in deterioration in S/N ratio. Therefore, the capacitor C1 having a suitable value is connected in parallel with the resistor R3, which is a feedback resistor, for obtaining better results. In this way, although the frequency response control circuit 16 shown in FIG. 10 is capable of controlling the level of high-frequency components by using resistors and capacitors, some other ways may be applicable, for instance, a tansversal filter, whose group delay frequency characteristic is satisfactory, may be used.

Figure 11:
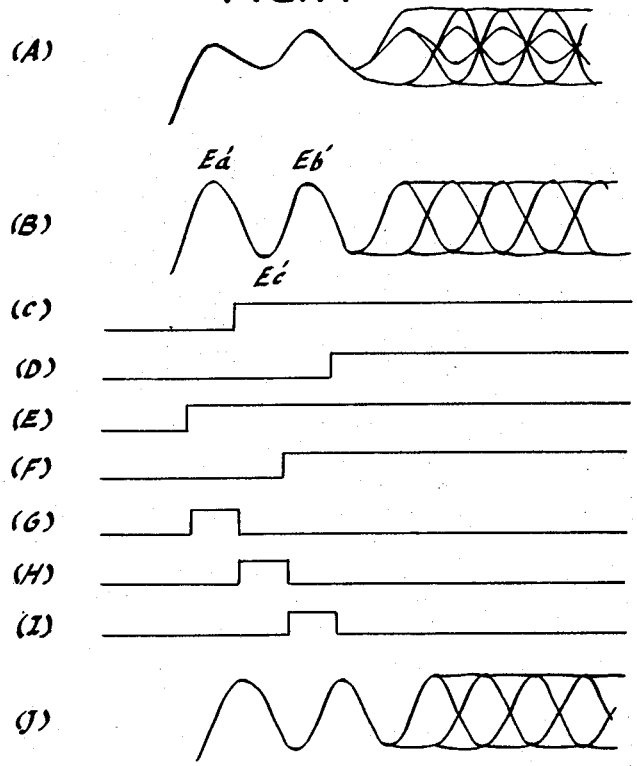
FIGS. 11(A) through (J) are diagrams for the description of the data acquisition circuit shown in FIG. 9.

The above-mentioned control signal applied to gate of the FET 28 of the frequency response control circuit 16 for controlling the same will be described with reference to FIG. 11. FIG. 11(A) is a diagram showing a waveform of the output signal from the AGC circuit 15; FIG. 11(B) being a diagram showing a waveform of the output signal from the frequency response control circuit 16; FIGS. 11(C), (D), (E), and (F) being diagrams showing waveforms of output signals at terminals Q of the latches 5', 6', 22 and 23; FIGS. 11(G), (H), and (I) being diagrams showing waveforms of the output signals from the AND gates 24, 25 and 26; and FIG. 11(J) being a diagram showing a waveform of the output signal from the delay circuit 17. The control signal is produced by using the peak levels Ea', Eb' and Ec' of the data synchronizing signal of 1010. The detection of the peak levels Ea', Eb' and Ec' is effected by the sample-and-hold circuits 18, 19 and 20. Sample-and-hold pulse trains respectively applied to the sample-and-hold circuits 18, 19 and 20 are signals having different timings shown in FIGS. 11(G), (H) and (I), and these signals are produced by the AND gates 24, 25, and 26, by using output signals of the latches 5', 6' 22, and 23. FIGS. 11 (C), (D) and (E) show timing relationship between outputs from terminals Q of the latches 5', 6' 22, and 23, where the outputs from the terminals $\overline{Q}$ are outputs whose polarity is an inversion of the outputs from the terminals Q. Since the sample-and-hold pulses are produced by the AND gates 24, 25 and 26 in this way, their timings respectively correspond to the first logic "1", the first logic "0" and the second logic "1" of the data synchronizing signal of "1010" bit pattern. Although these signals may be produced by other circuits, the circuitry shown in FIG. 9 can be actualized by only adding several circuit elements to conventional circuitry.

In the above-described embodiment, in order to detect the peak levels Ea', Eb' and Ec' of the data synchronizing signal of 1010, the sample-and-hold circuits 18, 19 and 20, rather than peak-hold circuits, are used. The reason for this is that sample-and-hold circuits provide simpler circuit configuration than peak-hold circuits where peak hold circuits should have complex structure since detection time allowed for peak level detection is very short. However, when sample-and-hold circuits are used, since peak values cannot be detected at timings of respective output signals from the AND gates 24, 25 and 26, which are the sample-and-hold pulses, it is necessary to delay the output signal from the frequency response control circuit 16 by way of the delay circuit 17, where the amount of delay is selected so that the data synchronizing signal assumes a peak value at a trailing edge of the sample-and-hold pulse. FIG. 11(J) is a waveform of a PCM signal which has been delayed.

In this way, the peak levels Ea', Eb' and Ec' of the data synchronous signal of 1010 are detected by the sample-and-hold circuits 18, 19 and 20, and are fed to the adder-subtractor 21. The adder-subtractor 21 is a circuit which performs addition and/or subtraction of d.c. signals (which are actually accompanied by slight level variation) by way of an operational amplifier, and produces one of the following differences:

(1) Eb'−Ea'
(2) Eb'−Ec'
(3) Ea'−(Eb'+Ec')/2

The adder-subtractor 21 may be desiged to obtain one of the above three differences (1), (2) and (3), and these three different ways of obtaining the difference value as the control signal are referred to methods (1), (2) and (3) hereinafter.

Furthermore, the adder-subtractor 21 peforms a gain control and level shifting which are suitable for the characteristic of the FET 28 used in the gain control circuit 16. In the circuit shown in FIG. 9, the output signal from the frequency response control circuit 16 is used as the detection signal of the peak level of the data synchronizing signal, and the control signal, which is produced by using the result of detection, is fed back to the frequency response control circuit 16. Namely, the frequency response control of the high-frequency components forms a feedback loop. Apart from this, although a feedforward system of using the output of the AGC circuit 15 as the input signal to the delay circuit 17 may be possible, the feedback system of the above-described embodiment can perform more accurate frequency response control because the variations in the characteristics of the FET 28 used in the control circuit can be absorbed. In this way, since a feedback loop is formed, the output signal from the frequency response control circuit 16 is improved in connection with its eye pattern as shown in FIG. 11(B) when compared to the output from the AGC circuit 16 shown in FIG. 11(A).

Now the above-mentioned three methods (1), (2) and (3) of producing the control signal for effecting frequency response control of the high-frequency components will be described in detail.

FIGS. 12 and 13 show circuit arrangements of the adder-subtractor 21 of FIG. 9, where the adder-subtractor of FIG. 12 may be used for either of the methods (1) and (2), and the other adder-subtractor of FIG. 13 may be used for the method (3). In FIGS. 12 and 13, references 29, 30 and 31 are operational amplifiers used as buffer amplifiers so as to provide high input impedance, and these operational amplifiers may be removed if unnecessary. Another operational amplifier 32 is used to perform addition-subtraction between input signals. A variable resistor VR3 is used to give an offset voltage to the operational amplifier 32, and this offset voltage will be used as a gate bias voltage for the FET 28 of the frequency response control circuit 16 of FIG. 10. Therefore, a suitable bias voltage may be selected by manually adjusting the variable resistor VR3. In the illustrated embodiments of FIGS. 12 and 13, although the offset voltage is applied separately from the signal input terminals (+ and −), offset voltage adjustment may be effected by directly applying a d.c. voltage to the input terminals.

An output signal from the operational amplifier 32 is applied via a low pass filter comprising a resistor R8 and a capacitor C3 to the frequency response control circuit 16, where the low pass filter is employed for removing undesirable influence due to noises mixed in the data signal which noises are apt to occur because of overshoot appearing in the sample-and-hold circuits 18, 19 and 20, and signal dropout in the reproduced PCM signal.

Since the polarity of the control signal, i.e. the output voltage from the operational amplifier 32, is determined in accordance with control voltage vs frequency response characteristic of the frequency response control circuit 16, the non-inverting input terminal (+) and the inverting input terminal (−) of the operational amplifier may be reversed if necessary.

In the case of the method (1), input terminals 21a and 21b of the adder-subtractor 21 shown in FIG. 12 are respectively connected to the output terminals of the sample-and-hold circuits 20 and 18 so as to receive Eb' and Ea' respectively. In the case of the method (2), input terminals 21a and 21b of the adder-subtractor 21 shown in FIG. 12 are respectively connected to the output terminals of the sample-and-hold circuits 20 and 19 so as to receive Ec' and Eb' respectively. In the case of the method (3), input terminals 21a, 21b and 21c of the adder-subtractor 21 shown in FIG. 13 are respectively connected to the output terminals of the sample-and-hold circuits 18, 19 and 20 so as to receive Ea', Ec' and Eb' respectively.

In the case of the method (1), when a calculated value of Eb'−Ea' is greater than 0, namely, when Eb' is greater than Ea', the level of the high-frequency components is raised so that Ea' becomes greater than Eb'. Although the eye pattern can be improved by this method (1) in many cases, Ea' does not become greater than Eb' on rare occasions even if the high-frequency components are corrected. In this case, the feedforward system is more effective rather than the feedback system.

In the case of the method (2), when a calculated value of Eb'−Ec' is smaller than a predetermined value (0.3 [V]), the use of a feedback system which raises the level of high-frequency components is more effective.

In the case of the method (3, ) this method is effective for both the feedback loop and feedforward system, but it causes slight increase in the number of parts when compared to the cases of the methods (1) and (2).

According to the method (3) a voltage difference between Ea' and (Eb'+Ec')/2 is obtained as the control voltage. FIG. 14 shows the relationship between these voltages, and it will be understood that (Eb'+Ec')/2 indicates a voltage at a point M which represents a midway voltage between Ec' and Eb'.

Although the method (1) suffers from a drawback that the high-frequency components are amplified too much when Ea' does not become greater than Eb' even if the frequency response is controlled by using the control signal of Eb'−Ea', the method (3) does not suffer from such drawbacks because the midway voltage (Eb'+Ec')/2 is substantially constant all the time. In FIG. 13, the value of a resistor R10 is selected to be equal to the value of a resistor R12 so that $(Eb'+Ec')/2$ is obtained at the noninverting input terminal (+) of the operational amplifier 32.

Figure 15:
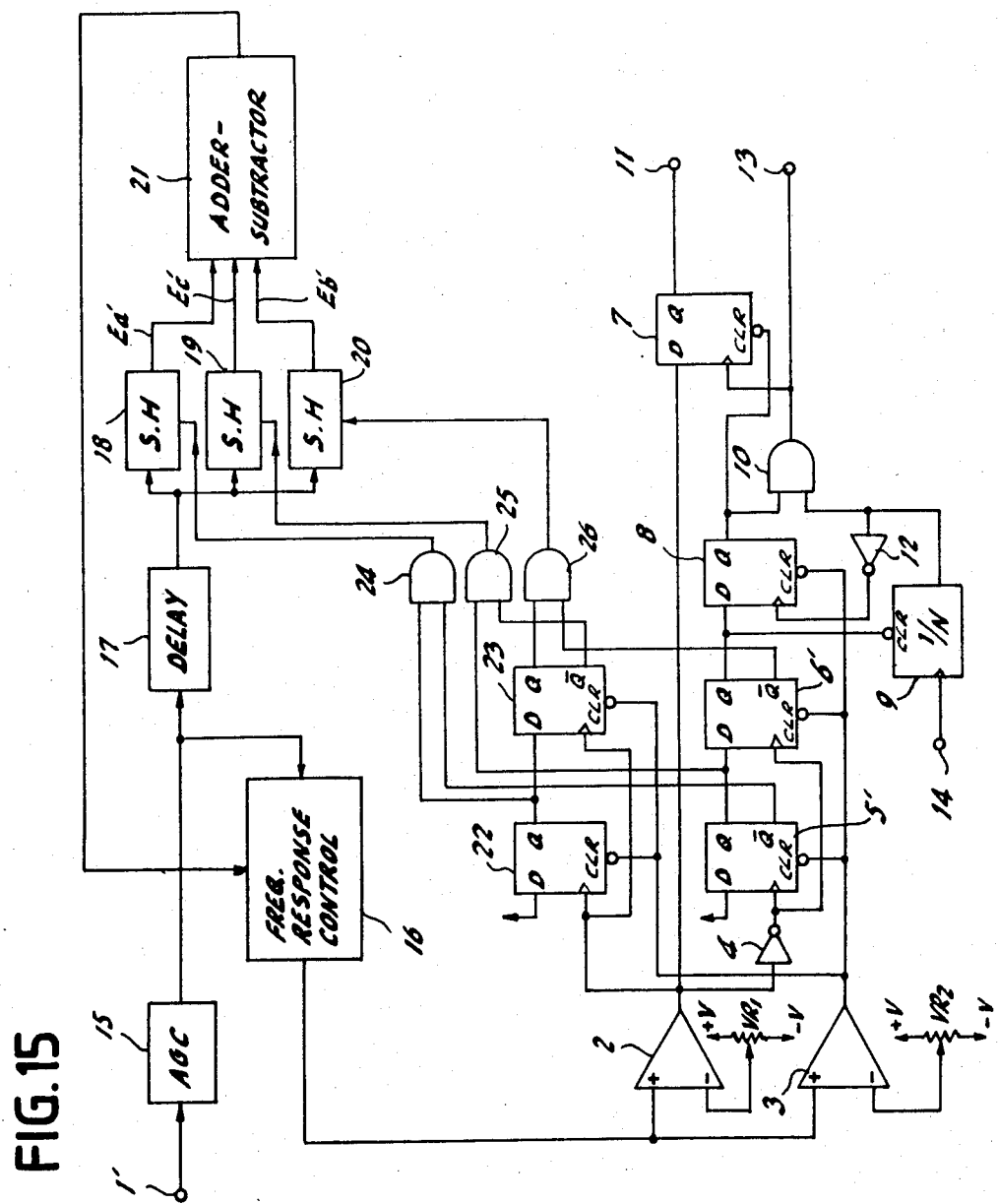
FIG. 15 is a block diagram showing another embodiment of a data acquisition circuit according to the present invention.

FIG. 15 shows another embodiment of the data acquisition circuit according to the present invention. This embodiment is directed to the above-mentioned feedforward system, and is substantially the same as the emodiment of FIG. 9 except that the delay circuit 17 is directly responsive to the AGC circuit 15, and the output signal from the frequency response control circuit 16 controlled by the control signal from the adder-subtractor 21 is fed to only the operational amplifiers 2 and 3. As a result, the peak levels of logic "1" and "0" of the data synchronizing signal is directly derived from the reproduced PCM signal whose frequency response is not yet controlled by the frequency response control circuit 16.

As described in the above, although conventional PCM processors have suffered from various problems because it is unstable when used in long-time mode of a VTR, it is now possible to extremely stably effect data acquisition by using the above-described data acquisition circuit, while it is also possible to construct a data acquisition circuit by using an LSI or the like used in conventional PCM processors.

Because of the above-described structure, the present invention has advantages that reliability and stablity are high, where the deterioration of the eye pattern of the reproduced PCM signal due to the variation in digital transmission line can be automatically corrected so as to accurately effect data acquisition even in long-time mode of the VTR in which tape cost can be saved.

The above-described embodiments are just examples of the present invention, and therefore, it will be apparent for those skilled in the art that many modifications and variations may be made without departing from the spirit of the present invention.

What is claimed is:

1. A circuit arrangement for a data acquisition circuit of a PCM processor responsive to a PCM signal of a predetermined format and having a 1010 synchronizing signal and a digital signal both arranged in series of data blocks so that each 1010 synchronizing signal is followed by a corresponding data block, said circuit arrangement comprising:
   (a) first means responsive to bits of said 1010 synchronizing signal of signal PCM signal for producing timing signals;
   (b) second means responsive to said timing signals for detecting positive and/or negative peak levels of bits of only said 1010 synchronizing signal of said PCM signal;
   (c) third means responsive to said second means for producing a control signal representative of detected peak levels of said 1010 synchronizing signal; and
   (d) a frequency response control means responsive to said control signal for changing the frequency response to said PCM signal such that the frequency response to said PCM signal is controlled by said control signal which is produced using the peak levels of said 1010 synchronizing signal which immediately precedes each of said data blocks,
   said third means comprising at least two sample-and hold circuits used for respectively sampling and holding the levels of two successive positive-going peaks corresponding to "1" in said 1010 synchronizing signal so that said control signal represents a difference between amplitudes of said two successive positive-going peaks.

2. A circuit arrangement as recited in claim 1 wherein said frequency response control means comprises amplifier means connected for receiving said PCM signal and said control signal,
   said amplifier means including a frequency sensitive circuit having a frequency setting component,
   said frequency setting component receiving said control signal for altering the frequency response of said frequency setting circuit and of said amplifier means.

3. A circuit arrangement as recited in claim 1, wherein said third means comprises at least three sample-and-hold circuits for respectively sampling and holding the levels of said two successive positive-going peaks corresponding to the first and second "1" signals of said 1010 synchronizing signal and for sampling and holding the level of a negative-going peak corresponding to the first "0" signal of said 1010 synchronizing signal, so that said control signal represents a value given by $$Ea'-(Eb'+Ec')/2$$

where Ea' and Eb' are the levels of said two successive positive-going peaks and Ec' is the level of said negative going peak of said 1010 synchronizing signal.

4. A circuit arrangement as recited in claim 3 wherein said predetermined format of said PCM signal is such that said 1010 synchronizing signal follows a pedestal level portion considerably longer than each "1" or "0" of said 1010 synchronizing signal, said pedestal level being lower than the level of "0" of said 1010 synchronizing signal.

5. A circuit arrangement for a data acquisition circuit of a PCM processor responsive to a PCM signal of a predetermined format and having a 1010 synchronizing signal and a digital signal both arranged in series of data blocks so that each 1010 synchronizing signal is followed by a corresponding data block, said circuit arrangement comprising:
   (a) first means responsive to bits of said 1010 synchronizing signal of said PCM signal for producing timing signals;
   (b) second means responsive to said timing signals for detecting positive and/or negative peak levels bf bits of only said 1010 synchronizing signal of said PCM signal;
   (c) third means responsive to said second means for producing a control signal representative of detected peak levels of said 1010 synchronizing signal; and
   (d) a frequency response control means responsive to said control signal for changing the frequency response to said PCM signal such that the frequency response to said PCM signal is controlled by said control signal which is produced using the peak levels of said 1010 synchronizing signal which immediately precedes each of said data blocks
   wherein said frequency response control means includes means for changing the frequency response of said PCM processor to said PCM signal as a function of said detected peak levels.

6. A circuit arrangement as receited in claim 5 wherein said means for changing comprises gain changing means for changing a gain of a signal path for PCM signal components of a predetermined frequency range.

7. A circuit arrangement as recited in claim 6 wherein said gain changing means comprises means for changing a resistance in series with a capacitance in a gain circuit thereby to change, in accordance with said control signal, the gain of said gain circuit for said predetermined frequency range determined by said resistance and said capacitance.

8. A method of improving the waveform of eye pattern of a PCM signal of a predetermined format and having a 100 synchronizing signal and a digital signal both arranged in series of data blocks so that each 1010 synchronizing signal is followed by each data block, said method comprising the steps of:
  (a) detecting bits of said 1010 synchronizing signal of said PCM signal for producing timing signals;
  (b) detecting positive and/or negative peak levels of bits of only said 1010 synchronizing signal of said PCM signal by using said timing signals;
  (c) producing a control signal using detect peak levels of said 1010 synchronizing signal; and
  (d) controlling the frequency response to said PCM signal such that the frequency response to said PCM signal is controlled by said control signal which is produced using the peak levels of said 1010 synchronizing signal which immediately precedes each said data block said step of producing said control signal comprising the further steps of sampling and holding the levels of two successive positive-going peaks corresponding to "1" in said 1010 synchronizing signal so that said control signal represents a difference between amplitudes of said two successive positive-going peaks.

9. A method as recited in claim 8 comprising the step of providing said predetermined format of said PCM signal such that said 1010 synchronizing signal follows a pedestal level portion considerably longer than each "1" or "0" of said 1010 synchronizing signal, said pedestal level being lower than the level of "0" of said 1010 synchronizing signal.

* * * * *